Figure 1:
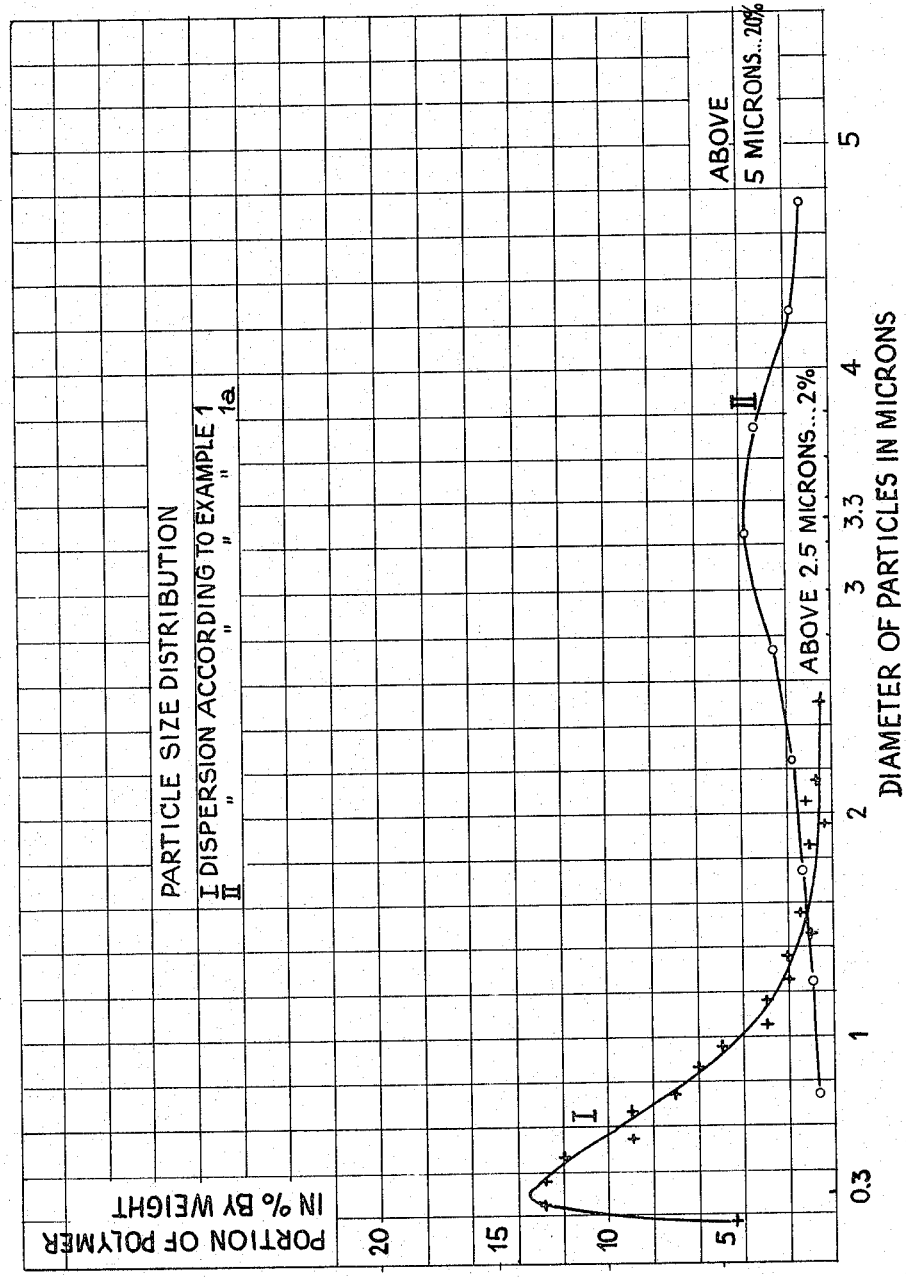

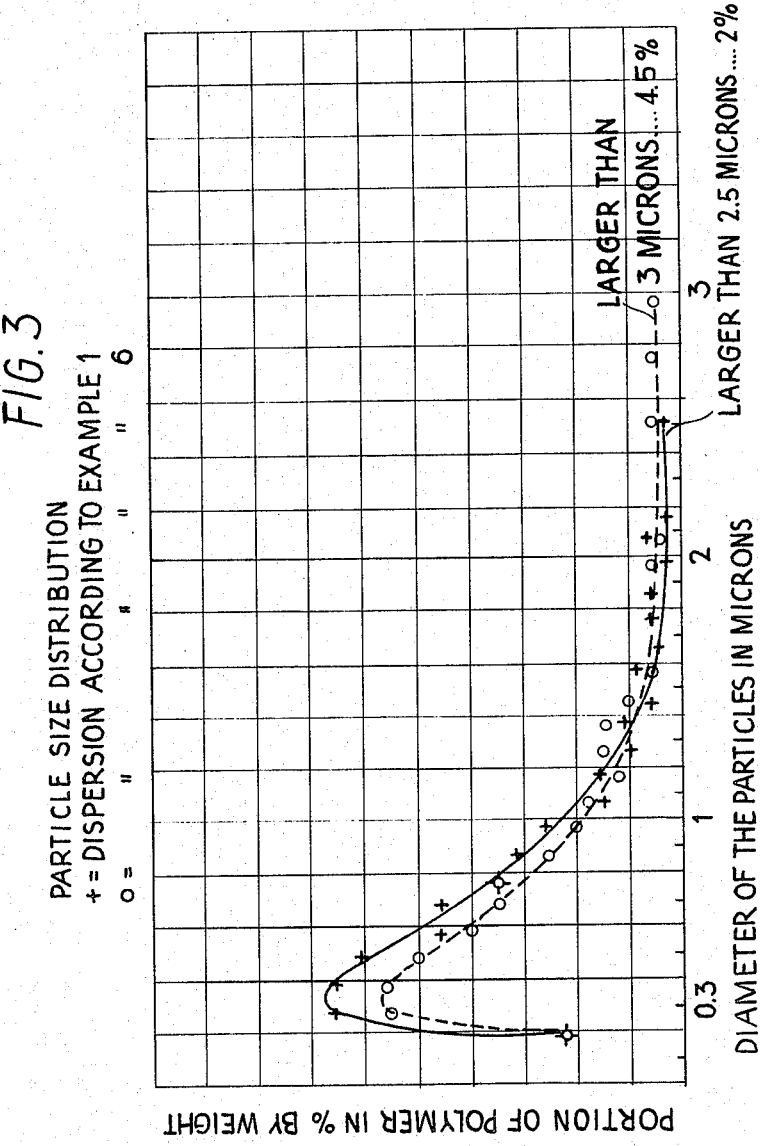

United States Patent Office 3,301,805
Patented Jan. 31, 1967

---

3,301,805
PROCESS FOR THE MANUFACTURE OF STABLE AQUEOUS DISPERSIONS OF VINYL ESTER POLYMERS
Karl-Heinz Kahrs, Anton Staller, and Johann Wolfgang Zimmermann, Frankfurt am Main, Germany, assignors to Farbwerke Hoechst Aktiengesellschaft vormals Meister Lucius & Bruning, Frankfurt am Main, Germany, a corporation of Germany
Filed May 7, 1962, Ser. No. 192,645
Claims priority, application Germany, May 6, 1961, F 33,867
11 Claims. (Cl. 260—29.6)

The present invention relates to a process for the manufacture of improved stable aqueous dispersions of polyvinyl esters or copolymers of vinyl esters with other copolymerizable monomers and to the dispersions obtainable thereby.

Dispersions of this kind are applied in an ever-increasing degree for quite a number of technical utilizations, for example as vehicles for emulsion paints and plastic masses, for wall coatings and also for floor coverings, as adhesives and glues and for many similar purposes. The rapid expansion and development in this field involves ever-increasing requirements as to the quality of the dispersions.

In addition to a sufficiently high solid content of 50% and more, a storage stability of an unlimited duration as well as a sufficient ability to withstand shear stress and a sufficient insensitiveness even to high dilutions are some of the primary prerequisites for the usefulness of the products on an industrial scale. It is also desirable that the products possess as high a freeze-thaw stability as possible, possibly down to $-10°$ C. and lower. The latex viscosity shall, without the addition of thickening agents which, as foreign substances, disturb the formation of the film in most cases, be adjustable within wide limits already in the course of preparing the dispersions without modification of the other desired properties. In many cases, for example when applying the dispersion as a vehicle for paints and coatings, it is required that the dispersions have a thixotropic behavior. The dispersion must, furthermore, be compatible with plasticizers and pigments. For painting, bonding and gluing purposes, it is important that the dispersions possess as low a "chalking point" (i.e., the drying temperature of the dispersion at which it still yields a clear film) as possible, i.e., the dispersion shall dry at as low a temperature as possible, possibly several degrees above $0°$ C., so as still to yield a homogeneous clear film without inhomogeneities being indicated by a whitish turbidity. With respect to the properties of the film it is desired that the film should possess—in addition to a good gloss, a sufficient flexibility and elongation at break, especially as high a resistance to water as possible, i.e., stability to reemulsification and wet abrasion resistance, a low absorption of water as well as a minimum of whitening rate when in contact with water. These properties of the film should become apparent already after a short drying period.

The prior art literature cites quite a number of processes according to which attempts are made to attain one or several of the aforementioned properties of the dispersion.

Stable aqueous dispersions of polymers or copolymers of vinyl esters are in general made by dispersing the monomer in water in the presence of a suitable dispersing agent which, at the same time, has the function of a protective colloid, while the dispersion is stirred in a suitable manner and the polymerization of the monomer or the monomers is carried out after the addition of polymerization catalysts at a suitable temperature.

The type of dispersing agent and the amount applied thereof are, in the case of a given monomer, decisive for the basic properties of a polymer dispersion, such as particle size, viscosity of the latex and the entire rheological behavior, stability, resistance to cold, chalking point and compatibility with pigments. In the same manner also the properties of the film obtained from the dispersions such as, for example, homogeneity, clarity, gloss, flexibility, elongation at break and resistance to water are decisively determined by the dispersing agent.

A dispersing agent extensively used on an industrial scale is polyvinyl alcohol by means of which, for example according to U.S. Patent No. 2,227,163 there can be prepared polymer dispersions, for example polyvinyl ester dispersions and vinyl ester copolymer dispersions, which have an excellent stability.

When using, for example, polyvinyl acetate dispersions for paints and coatings there are, however, often encountered difficulties owing to an insufficient resistance to water of the films applied. The insufficient resistance to water is due to the presence of the water-soluble dispersing agent, for example polyvinyl alcohol which provokes redispersion of the dried polymer in a more or less high degree. Further difficulties manifesting themselves with films from such dispersions are due to an insufficient transparency and to a deficient ability of the dispersions of forming films, especially at temperatures below room temperature. The latter deficiency generally results from an insufficient compatibility of the dispersing agent with the dispersed polymers. For this reason paints that have been prepared with these dispersions may become fissured after some time, for example on wood. Such negative phenomena, which are also partly due to an insufficient elongation at break and elasticity of the films can, as is well-known, be avoided to a certain extent by adding larger proportions of external plasticizers. However, such additions are in many cases undesired since, by the migration of the plasticizer into the priming or finishing coat, the structure of the entire system of applying a film coating or painting can be modified in a negative manner in the course of a certain time.

Since the ability of polymer dispersions to form films can be improved within certain limits by adjusting the polymer particles to a smaller particle size, water-soluble, surface-active substances (available in the form of many commercial emulsifiers) are added for this purpose according to some processes to the aqueous reaction medium containing the polyvinyl alcohol. U.S. Patents Nos. 2,614,087, 2,662,863 and 2,614,088 suggest that the sensitiveness to water of coats of paints of polyvinyl acetate dispersions can be diminished by using in the aqueous phase, in addition to polyvinyl alcohol, for example also oxethylation products of octyl phenol as a dispersing agent.

There are likewise known processes which, in addition to polyvinyl alcohol, also use emulsifiers in the aqueous phase as a dispersing agent. According to U.S. Patent No. 2,694,052 for example, there are used as additional emulsifiers fatty acid esters with sulfo groups or sulfuric acid ester groups. According to British Patent No. 857,514 there is used as a dispersion agent a combination of polyvinyl alcohol with water-soluble, nonionic emulsifiers of the type of an oxethylated polypropylene glycol or alkyl-aryl-polyoxy-alkylene alcohol and ditertiary alcohols as a third component, for example dimethyl hexindiole or dimethyl octindiole. According to British Patent No. 767,729 there is used as a dispersing agent in an aqueous reaction medium in the manufacture of copolymer dispersions of styrene or vinyl acetate with alkyl esters of $\alpha,\beta$-unsaturated dicarboxylic acids a mixture of, among others, polyvinyl alcohol, a condensation product of fatty alcohol with ethylene glycol and, as a third component, an anion-active emulsifier, for example, the sodium salt of the sulfuric acid semi-ester of dodecyl alcohol or the sodium salt of an alkyl-aryl sulfonic acid. In the process according to French Patent No. 1,211,521 for the manufacture of finely dispersed dispersions of a copolymer of vinyl acetate and maleic acid esters, there is used in a similar manner an emulsifier combination consisting of polyvinyl alcohol, partially oxethylated $C_{14}$–$C_{18}$ fatty alcohols and $C_{12}$–$C_{18}$ fatty alcohol sulfonates. However, these processes have the disadvantage that the latex-viscosity of the dispersions is low. For this reason it becomes necessary to add thickening agents for many purposes, especially for adhesives, but this addition impairs the ability to form films and also the resistance to water of the films. Another disadvantage of these dispersions which are, in general, rather finely dispersed, is their low freeze-thaw stability which, on an average, only extends to $-5°$ C.

Now we have found a process for the production of polyvinyl ester and vinyl ester copolymer dispersions which possess a good stability and freeze-thaw stability and are relatively finely dispersed and possess a very good ability for forming films, which films have an exceptionally high resistance to water, a good flexibility and elongation at break, the latex viscosity of said dispersions being continuously adjustable within wide limits from a thinly liquid to pasty consistency with the use of an emulsifier combination consisting of polyvinyl alcohol and graft polymers of vinyl esters on poly-1,2-epoxy hydrocarbons or on derivatives thereof as dispersing agents.

As graft polymers there are used especially—preferably water-soluble—products which can be obtained according to German Patents Nos. 1,077,430 and 1,081,230, i.e. according to processes which consist in dissolving polyalkylene oxides or polyalkylene glycols and/or polyalkylene glycol derivatives in vinyl esters, preferably vinyl acetate, or mixtures of vinyl esters, if necessary with the simultaneous use of other solvents, and polymerizing this solution in the usual manner with the addition of radical activators and/or by irradiation. Those graft polymers, especially water-soluble graft polymers, can be used with special advantage that are obtained according to the process of German Patent No. 1,110,419, i.e. a process for the manufacture of modified polyalkylene glycols or polyalkylene glycol derivatives, according to which vinyl esters or mixtures of vinyl esters, possibly together with other copolymerizable compounds, are grafted on polyalkylene glycols or polyalkylene glycol derivatives in the presence of radical activators and/or by irradiation, and which is characterized in that the polyalkylene glycol or the polyalkylene glycol derivative is used in an amount ranging from 50% to 99.9% by weight, calculated on the reaction mixture.

Those graft polymers can be used with special advantage of which at least 20 parts by weight dissolve in 80 parts of water at the respective polymerization temperature (usually from about 60° to about 90° C.). Depending on the composition of the graft polymers used according to the invention, the aqueous solutions thereof possess different turbidity points, in which solutions small amounts of insoluble portions separate upon heating after a certain temperature has been attained in a finely distributed state from the previously clear solution. There are preferably used graft polymers the 1% aqueous solution of which does not show turbidity up to a temperature of about 90° C. Products of this kind are suitably added to the aqueous reaction medium prior to the polymerization while products having a poorer water solubility or a turbidity point situated at lower temperatures (for example 75° C.) can be used in the monomer or mixture of monomers in the dissolved state.

The amounts of one or several graft polymers to be used according to the process of the invention generally range from 1 to 20 parts by weight per 100 parts of the monomer or monomer mixture applied for the dispersion polymerization. There are preferably used 5 to 10 parts by weight. In the case of a sufficient water solubility and an adequately high turbidity point the total amount of the graft polymer can be dissolved in the aqueous phase. In such a case the graft polymer can directly be prepared in the polymerization vessel itself. It is then, as a still warm melt, dissolved in water and, after the addition of polyvinyl alcohol and adjustment of the solution to the desired pH value, there is obtained the completely aqueous reaction medium. Such a working method is described in Example 7 following hereunder. However, it is also possible to apply the graft polymer dissolved in the monomer. Tests have shown that this method can even be applied with advantage in the dispersion polymerization of many a monomer or mixtures of monomers (cf. Example 11 following hereunder). In other cases of dispersion polymerization there are obtained optimum results when the graft polymer is applied in the dissolved state partly in the aqueous phase and partly in the monomer. It is suitable to ascertain in each individual case, in addition to the optimum composition and the amount of the graft polymer, the most advantageous method of adding the graft polymer to the reaction mixture by preliminary tests that can easily be carried through.

Comparative tests have shown that when using graft polymers as sole emulsifiers the dispersions obtained do not possess the same good properties as those obtained by the process of the invention, i.e. with the use of a combination of a graft polymer and polyvinyl alcohol. This is shown, for example, by a comparison between Examples 8 and 6.

Also in the case of a subsequent addition of a graft polymer to a finished polymer dispersion prepared with polyvinyl alcohol or other protective colloids, even when such additions are carried out with increased amounts of graft polymer or at an elevated temperature (75° to 80° C.) and/or with the addition of the usual polymerization activators, the dispersions obtained do not possess the same good properties as the dispersions obtained according to the present invention. This results, among others, from a comparison between Example 1b and Example 1, as given hereunder.

When a graft polymer, applied according to the present invention in addition to polyvinyl alcohol, is replaced by pure polyethylene glycol of the same molecular weight, there is likewise not obtained an improvement of the properties of the dispersion and the films made thereof, as results from a comparison between Examples 6 and 9 following hereunder.

The properties of the polyvinyl alcohol to be applied in addition to the graft polymer as the second main component of the combination of dispersing agents according to the invention may vary within wide limits. There may be used both a polyvinyl alcohol as obtained by the complete hydrolysis of a polyvinyl ester and also a polyvinyl ester than has only partially been hydrolyzed and which still contains acyl groups up to about 25% by weight, but which must be water-soluble and the 10% aqueous solution of which must have a turbidity point higher than about 90° C. There is preferably used polyvinyl acetate the total amount or, correspondingly, a partial amount of which has been hydrolyzed, which has a K-value (according to Fikentscher, "Cellulose-Chemie," vol. 13, p. 58 (1932)) of 20 to 100. There may also be used with advantage modified polyvinyl alcohols, for example oxethylated polyvinyl alcohol obtained, for example, according to the process as described in British patent application No. 8278/52. Furthermore there may be used with advantage those modified polyvinyl alcohols or modified polyalkylene glycols that are obtained according to German Patents Nos. 1,081,228 and 1,094,457 and Belgian Patent No. 604,624 by total or partial saponification of the graft polymers of vinyl esters, preferably vinyl acetate, on poly-1,2-epoxy hydrocarbons or polyalkylene glycols. The processes of the three last-mentioned patents are characterized in that a graft polymer prepared in a homogeneous phase from one or several vinyl esters and, possibly, from other compounds copolymerizable with vinyl esters on polyalkylene glycols in subjected to an acid or alkaline, total or partial saponification or alcoholysis. When carrying out these processes, it may be advantageous to saponify the graft polymer to such an extent or to subject it to an alcoholysis that the modified polyvinyl alcohol obtained is already soluble in water at 25° C., an amount of less than 50% by weight thereof consisting of vinyl alcohol units, or at most 80% of the vinyl ester groups of a graft polymer of which 50 to 99% by weight consists of a 1,2-epoxy hydrocarbon polymer and 1 to 50% by weight of the molecules of a vinyl ester of a saturated aliphatic monocarboxylic acid having 1 to 4 carbon atoms grafted on said 1,2-epoxy hydrocarbon polymer are converted into vinyl alcohol groups by alcoholysis with a saturated aliphatic monohydric alcohol. The amount of the polyvinyl alcohol applied in addition to the graft polymer vinyl ester/polyalkylene glycol ranges from 1 to 15 parts by weight, calculated on 100 parts of monomer or monomer mixture, preferably 2 to 5 parts by weight.

Suitable monomers from which the dispersions according to the invention can be obtained are, for example, vinyl ester of aliphatic saturated carboxylic acids having 2 to 18 carbon atoms, for example vinyl acetate, vinyl propionate, vinyl butyrate, vinyl valerate, vinyl esters of caproic acid as well as vinyl stearate. Vinyl benzoate may also be used. These esters can be polymerized singly or in admixture with one another.

It is also possible to copolymerize one or several of the aforementioned esters together with esters of unsaturated carboxylic acids, for example maleic acid, fumaric acid, itaconic acid or acrylic- or methacrylic acid and aliphatic alcohols, preferably saturated monohydric aliphatic alcohols having 1 to 8 carbon atoms.

At least 50 mol percent of these copolymers shall consist of one or several vinyl esters. However, it is especially advantageous to apply the process according to the invention for the production of improved vinyl acetate/homopolymer dispersions.

The total amount of the monomer can be added to the liquor (aqueous phase) at once by emulsifying it in the aqueous phase containing the dispersing agent, with agitation, for example, at a low or moderately elevated temperature, for example 20° to 50° C. After the addition of the polymerization catalyst, the batch is maintained, while stirring, at the desired polymerization temperature until the polymerization is finished. On the other hand, it is also possible only to place a partial amount of the monomer in the aqueous phase, to initiate the polymerization by adding a catalyst and heating the mixture and adding the remaining monomer in portions or continuously. Another mode of effecting the polymerization consists in heating the aqueous reaction medium containing the dispersing agent to the desired reaction temperature and, after the addition of the catalyst, to add the monomer continuously. This method of adding the monomer is especially preferred in the production of vinyl acetate/homopolymer dispersions since, with a relatively simple working method, it permits the maintenance of the desired reaction temperature by means of a corresponding regulation of the speed at which the monomer is metered in. In this case the reaction temperature is raised from about 67° C. in the beginning of the reaction to about 88° to 90° C. at the end of the polymerization. When copolymerizing, for example, vinyl acetate with the aforecited esters of alcohols and unsaturated carboxylic acids it is, in many cases, suitable to maintain the reaction temperature within somewhat lower limits, for example within the range of from 67° to 85° C.

As polymerization catalysts there are used one or several radical-forming compounds, for example water-soluble peroxide compounds such as hydrogen peroxide, ammonium- or alkali metal persulfate such as potassium- or sodium persulfate or alkali metal perborate. The amount of catalyst is generally situated within the range of 0.05 to 5%, preferably 0.1 to 2%, calculated on the weight of the monomer or monomers. It is in many cases advisable to retain a slight portion of the polymerization catalyst and to add this portion to the reaction mixture only after the addition of the monomer has been terminated in order to eliminate the last residues of monomers by polymerization. Furthermore it is often advantageous to use reducing activators, in addition to the peroxidic catalysts, for example a combination of hydrogen peroxide and sodium formaldehyde sulfoxylate, of hydrogen peroxide and the salts of bivalent iron, for example Mohr's salt $Fe(NH_4)_2(SO_4)_2 \cdot 6H_2O$, or salts of bivalent cobalt, for example cobalto-acetate.

The dispersion polymerization according to the invention is, in general, carried out at a pH of the aqueous phase of 2.5 to 7, preferably at a pH of 3–6. By the addition of various acids, for example formic acid, acetic acid and sulfuric acid, the initial pH value can be reduced when this becomes necessary.

The reaction time is situated within the range of about 1 to about 6 hours and generally ranges from 2 to 3 hours.

The process according to the invention renders it possible to produce homogeneous and stable dispersions having a solid content up to about 65% without impairing the very good properties of the dispersion films, as mentioned above. With given amounts of monomers and dispersing agents, the adjustment to a desired solid content is effected by choosing the corresponding amount of water in the reaction medium. However, it is also possible to prepare dispersions which first have a higher solid content, for example 60 or 65%, and to dilute said dispersions to a desired lower concentration, for example 50 or 55%, after the polymerization has been terminated.

A special advantage of the new process consists in the fact that with a given solid content, for example 50%, the latex-viscosity of the dispersions can be adjusted continuously within wide limits from a thinly liquid to pasty consistency without impairing the properties of the dispersions and films. This is possible on the one hand by altering the amount of the dispersing agent, i.e. the combination graft polymer/polyvinyl alcohol, calculated on the amount of monomer applied, whereby the latex-viscosity rises with the increasing amount of the dispersing agent applied. With a given amount of dispersing agent and a chosen ratio of graft polymer:polyvinyl alcohol the latex viscosity can be varied within especially wide limits by the molecular weight of the graft polymer used. As examples for the respective numerical relations reference is made to FIGURES 2 and 2a. The molecular weight of the graft polymer used can be varied both by choosing a corresponding molecular weight of the polyalkylene glycol base and by mixing graft polymers having different molecular weights.

The latex viscosity can finally be varied (while the amounts of the reaction components remain constant) also by the K-value of the polyvinyl alcohol used and the viscosity of the aqueous solution thereof which is dependent thereon, in such a manner that with the use of a polyvinyl alcohol having lower K-values dispersions are obtained that are more thinly liquid while with rising K-values higher latex viscosities are obtained. The dispersions are thixotropic and, therefore, excellently suited for being brushed on surfaces.

The dispersions obtained according to the invention have a particle size of from about 0.2 micron to about 1.2 microns, the main portion having a particle size of about 0.3 micron. The dispersions, therefore, belong to the category of the finely dispersed latices. This distribution of the particle size is independent of the molecular weight of the graft polymer used and the latex viscosity of the dispersions adjusted thereby (cf. FIGS. 1 and 3). The content of the dispersions of residual monomer is very low and situated far below 1%. The storage stability of the dispersions is practically unlimited and their mechanical resistance is very high, for example also to high shear stress occurring in the case of rapid stirring or in pumps. The dispersions may also be diluted in any desired manner without depositing phenomena occurring. Their freeze-thaw stability amounts at least to −18° C., i.e. neither the homogeneity of the dispersions as such nor the properties of the films made thereof are impaired by cooling the dispersions several times to −18° C. and heating them again subsequently to the usual temperature. This is especially remarkable on account of the fact that finely dispersed dispersions or dispersions containing fine and coarse particles generally exhibit a substantially lower freeze-thaw stability, for example of from 0° to 5° C.

Another advantage of the dispersions prepared according to the invention consists in the fact that they still dry in the air at relatively low temperatures, for example +3° C., yielding a clear homogeneous film, which can be attained with the polymer dispersions known hitherto only by the addition of larger amounts of plasticizers or by the use of internally plasticizing comonomers.

The films have a smooth surface with a very high gloss, they are flexible and tough and possess, even in the case of a vinyl acetate homopolymer, i.e. without plasticizing comonomer that has been incorporated by polymerization and without the addition of an external plasticizer, already an elongation at break of 210% on an average with a tensile strength of about 170 to 190 kg./cm.². Thus the films have mechanical properties which render possible their utilization on an industrial scale in many fields of application without the addition of external plasticizers. By way of comparison films of dispersions prepared without graft polymer with polyvinyl alcohol as the sole dispersing agent are brittle and possess no elongation. Although the polymerization according to the invention is carried through with the use of a dispersing agent which is composed of water-soluble components, the films made of these dispersions possess, unexpectedly, an extremely high resistance to water. It is, furthermore, very advantageous that the resistance to water which manifests itself in a complete stability of the films to reemulsification when exposed to abrasion under water and also in a low water absorption—about 15% on an average—when stored in water for several days as well as by a water-repellent behavior of the surface, sets in already after a short drying period. Even a treatment with flowing steam, although it brings about a plasticizing of the thermoplastic polymer film, does not provoke any reemulsification phenomena whatever in the film which remains entirely homogeneous and intact. In contrast thereto films made of dispersions which had only been prepared with polyvinyl alcohol as a dispersing agent, are destroyed already after a short treatment.

The resistance to water of the film can even be increased with respect to an especially high initial resistance to water by adding to the dispersion relatively small amounts, for example, 10 to 15%, calculated on the polymer, of a plasticizer such as, for example, dibutyl phthalate. Films made of such dispersions and having a thickness of about 30 to 50 microns do not show turbidity upon subsequent contact with water over a certain period already immediately after drying (about 10 minutes drying time at room temperature) and remain transparent, while films made of the commercial polymer dispersions, especially vinyl acetate/homopolymer dispersions, at once exhibit whitening thus displaying the technically undesirable "formation of water stains." A very high initial resistance to water of the film can also be attained by adding to the dispersions prepared according to the invention small amounts (for example 5 to 10%, calculated on the polymer) of volatile, "temporary" auxiliary agents for the film consolidation such as, for example, hexylene glycol, glycolic acid ester, etc.

The addition of a small amount of plasticizer, moreover, brings about an increase of the elongation (from about 210% without the addition of a plasticizer) to about 1000%. When the addition of the plasticizer is increased to 25%, which corresponds to an amount frequently used in industry, the elongation is increased to more than 5000%. In comparison herewith, this amount of plasticizer effects an increase of the elongation of the film only up to about 1100% in the case of an analogous dispersion prepared only with polyvinyl alcohol as the sole dispersing agent.

The dispersions prepared according to the invention are compatible with the usual pigments to an unlimited extent with and without the addition of a plasticizer. Coats of paint produced with such pigmented dispersions are extremely resistant to water and resistant to wet abrasion and exhibit almost no formation of water stains.

The following examples serve to illustrate several modes of executing the polymerization process according to the invention while the examples given for the purpose of comparison, in which the polymerization is carried out in the absence of a graft polymer or in which the graft polymer is added after the polymerization to the finished dispersion, show the advantages of the present invention. The examples serve to illustrate the invention but are not intended to limit it thereto:

*Example 1*

In a reaction vessel (capacity 10 l.) equipped with stirrer, thermometer, reflux condenser and feeding vessel for the monomer, there was prepared a solution as an aqueous reaction medium consisting of 95 grams of polyvinyl alcohol having an acetyl content of 1.5% and a viscosity of 18 to 25 centipoises in a 5% aqueous solution,
292 grams of a water-soluble graft polymer vinyl acetate/polyethylene glycol with a content of 21% by weight of vinyl acetate, while the polyethylene glycol base had a molecular weight of about 4000. The viscosity of the 10% aqueous solution of this product was 4 centipoises at 20° C., the turbidity point of the 1% aqueous solution was situated at about 95° C. A 1% solution had a surface tension of about 42 dynes/cm. at 20° C. in 3053 grams of water, free from salt. This solution was adjusted with a 10% soda solution to a pH of 6 and then with formic acid to a pH of 3.

After heating the solution to 80° C., 14.5 grams of hydrogen peroxide of 35% strength were added as an activator, and then the monomer was added at once.

2636 grams of vinyl acetate were run into the reaction mixture continuously in the course of about 180 minutes at a uniform rate and at a reaction temperature of about 80° C.

After the monomer addition was terminated, 1.4 grams of a hydrogen peroxide of 35% strength were added to the reaction mixture in order to complete the conversion. The reflux of the monomer ceased after about 5 to 10 minutes and the temperature of the reaction mixture rose spontaneously to 85 to 88° C. The reaction mixture was maintained for about 30 minutes at a temperature of about 85° to 80° C. and then cooled.

The dispersion obtained had a solid content of about 50%, it was homogeneous, free from coarse particles and could be brushed well. In the case of a solid content of 50% the latex viscosity of the dispersion was about 17.5 poises. The latex viscosity was determined in this example (and also in the following examples) at 20° C. in the Höppler Precision Viscosimeter. The particle size ranged from 0.2 micron to about 1.2 microns, while the main portion had a particle size of 0.3 micron (cf. also FIG. 1). The content of residual monomer was 0.3 to 0.5%. By cooling several times to −18° C. and reheating, the homogeneity of the dispersion was not impaired. The dispersion was stable when being stored and did not undergo changes even when being stored at 70° C. for several days.

At a temperature of +3° C. coats of the dispersion still formed transparent homogeneous films having a very high gloss. The films were stable to reemulsification, i.e., they remained intact when exposed to abrasion under water and did not give any turbidity of the leaching water. Their water absorption amounted to about 15%. The films were flexible also without the addition of plasticizers. Their elongation at break amounted to 210% with a tensile strength of 170 kg./cm.$^2$. By the addition of, for example, 15% (calculated on the solid polymer) of dibutyl phthalate to the dispersion as a plasticizer, the elongation at break was increased to 1100% on an average, while the resistance to water still increased. After a drying time in the air of only 10 minutes films made of this plasticized dispersion and having a thickness of about 30 microns no longer exhibited whitening when water was sprinkled thereon.

When 25% of dibutyl phthalate was added to the dispersion, the elongation at break increased to more than 5000%. It is especially valuable that the portion of the reversible, i.e., elastic, elongation of the films is higher than in the case of films made of the products hitherto known. The high freeze-thaw stability of the dispersion was not impaired by the addition of the plasticizer.

The dispersion can be mixed with pigments in any desired degree with or without the addition of plasticizers without coagulations occurring. Such highly pigmented dispersions remained stable over a storage period of at least 9 months.

The stability to reemulsification of the dispersion films leads to a very good resistance to wet abrasion of pigmented coatings, too. The fact that the films that have not been pigmented do not exhibit whitening when being watered is of high technical value with respect to the resistance to water of the pigmented dispersion films inasmuch as the "formation of water stains" does not occur which is so undesirable in the technique of painting.

It is possible, by reducing the amount of water of the batch, to increase the solid content of the dispersion up to about 65% without changes occurring in the quality of the dispersion or of the films made thereof apart from the fact that the latex viscosity is increased up to a pasty consistency.

*Example 1a*

This batch differed from that of Example 1 only in that the polymerization was carried out in the absence of the graft polymer. The amount of the graft polymer applied in Example 1 was replaced in this example—in order to attain the same solid content of the dispersion—by the same amount of vinyl acetate which was introduced together with the amount of monomer indicated in Example 1. The other proportions of the batch and the reaction conditions were the same as described in Example 1.

There was obtained a homogeneous dispersion with a solid content of 50%, a latex viscosity of about 5 poises and a content of residual monomer of 0.5%. The particle sizes were widely scattered and ranged from about 1 micron to about 5 microns (a portion of 20% ranging above 5 microns) while the main portion had a particle size of 3.3 microns (cf. FIG. 1). When drying in the air the dispersion no longer formed clear films at a temperature below 15° C., but only white chalky layers. Films which formed at a temperature above 15° C. were opal-transparent and only had a dull luster. They were not stable to reemulsification and at once exhibited whitening upon being watered. The film had a tensile strength of 104 kg./cm.$^2$ but had no elongation whatever. The film was hard and brittle and broke already under very slight bending stress. After the dispersion had been plasticized with 25% of dibutyl phthalate (calculated on the solid polymer), the film had an elongation at break of 1080% on an average, while the elongation at break of a film made of the dispersion as obtained according to Example 1 and having the same content of plasticizer amounted to more than 5000%.

*Example 1b*

The operation was carried out as described in Example 1a but there was only applied the amount of vinyl acetate as indicated in Example 1. When the polymerization was terminated, the graft polymer as described in Example 1 was introduced, with agitation, in the same amount as described in that example in the form of a 50% aqueous solution (temperature about 75° C.) into the dispersion that still had a temperature of about 80° C.

In a parallel test, 0.26 part by weight of a hydrogen peroxide of 35% strength were admixed to 100 parts by weight of the dispersion prior to the addition of the graft polymer, whereupon the dispersion that had been mixed with the solution of the graft polymer was maintained for another two hours at a temperature of 75° C.

The dispersions thus modified yielded films that did not differ with respect to their properties from those films made with the dispersion as obtained according to Example 1a.

A comparison between Example 1 and Example 1a illustrates the substantial improvement of the properties of films made of dispersions obtained by polymerization in the presence of a graft polymer vinyl acetate/polyethylene glycol. As shown in Example 1b, this effect was not obtained by the subsequent addition of the water-soluble graft polymer to a finished dispersion even in the presence of the freshly added activator.

In the following Examples 2, 3, 4, 5 and 6 the polymerization was carried out in the presence of a graft polymer. As regards the proportions of the batch and the reaction conditions, the operation was carried out as described in Example 1. However, there were applied graft polymers the polyethylene glycol base of which had a higher molecular weight than that used in Example 1.

*Example 2*

Instead of the graft polymer used in Example 1, there was applied a graft polymer the polyethylene glycol base of which had a molecular weight of 6100. The content of the graft polymer of chemically-bonded vinyl acetate amounted to 21.2% by weight, while the viscosity of the 10% aqueous solution at 20° C. was 5.7 centipoises.

There was obtained a homogeneous smooth dispersion having a latex-viscosity of 23 poises, the other properties of which corresponded to the properties of the dispersion and the films made thereof obtained according to Example 1.

*Example 3*

Instead of the graft polymer used in Example 1 there was applied a graft polymer the polyethylene glycol base of which had a molecular weight of 8200. The graft polymer contained 19.5% by weight of chemically-bonded vinyl acetate, the viscosity of the 10% aqueous solution thereof was 7.45 centipoises at 20° C. There was obtained a smooth and stable dispersion which had a latex viscosity of 100 poises. The other properties of the dispersion and of the films made thereof corresponded to the properties of the products made according to Examples 1 or 2.

*Example 4*

Instead of the graft polymer used in Example 1, there was used a product containing 19% by weight of chemically-bonded vinyl acetate, while the molecular weight of the polyethylene glycol base was 9250. The viscosity of the 10% aqueous solution of the graft polymer was 8.56 centipoises at 20° C.

The homogeneous dispersion obtained had a latex-viscosity of 240 poises, while the other properties of the dispersion, as well as the quality of the film thereof dried in the air, were the same as those described, among others, in Example 1.

Example 5

Differing from Example 1, there was used a graft polymer of vinyl acetate on a polyethylene glycol having a molecular weight of 10,300, which graft polymer contained 18.6% by weight of chemically-bonded vinyl acetate. The 10% aqueous solution of the graft polymer had a viscosity of 9.96 centipoises at 20° C.

There was obtained a dispersion having a latex-viscosity of 600 poises the other properties of said dispersion, including those of the film obtained thereof, being identical with the properties as described in Example 1.

Example 6

Differing from Example 1, there was used a graft polymer of vinyl acetate on polyethylene glycol having a molecular weight of 25,000 which graft polymer contained 17% by weight of chemically-bonded vinyl acetate. The viscosity of the 10% aqueous solution of the graft polymer was 48 centipoises at 20° C.

The dispersion obtained was entirely homogeneous but had a pasty consistency so that the latex-viscosity could not be measured in the Höppler Viscosimeter. The other properties of the dispersion corresponded to those described in Example 1.

A film made of this dispersion and dried in the air had an elongation at break of 209% and a tensile strength of 188 kg./cm.$^2$, i.e. practically the same mechanical properties as a film made of the dispersion as obtained according to Example 1. The film was likewise stable to re-emulsification and exhibited the same low absorption of water of about 15%.

The result of the determination of the particle size distribution of the dispersion is practically identical with that found in Example 1. The results of the measurements are plotted in FIG. 3 of the accompanying drawings which show that both the particle size and the other basic properties of the dispersion—with the exception of the latex-viscosity—and also the good properties of the films made of the dispersions are not dependent on the molecular weight of the graft polymer used. The constant particle size is due to the surface activity of the graft polymer which was always used in the same amounts (cf. Examples 1, 2, 3, 4, 5 and 6), which surface activity remained constant with 41 to 44 dynes/cm. (measured in aqueous solutions of 1% strength) and was likewise independent of the molecular weight.

It is extremely valuable from a technical point of view that in addition thereto (as shown in Examples 1, 2, 3, 4, 5 and 6) the latex-viscosity of the dispersions prepared according to the invention can be adjusted continuously within wide limits by the choice of the molecular weight of the graft polymer applied. In the same manner as this can be done with the molecular weight of the polyethylene glycol base of the graft polymer, also the viscosity of the aqueous solutions of the graft polymer with the same concentration can be related to the latex-viscosity of the dispersions since the viscosity of the aqueous solution is a function of the molecular weight.

Figure 2:
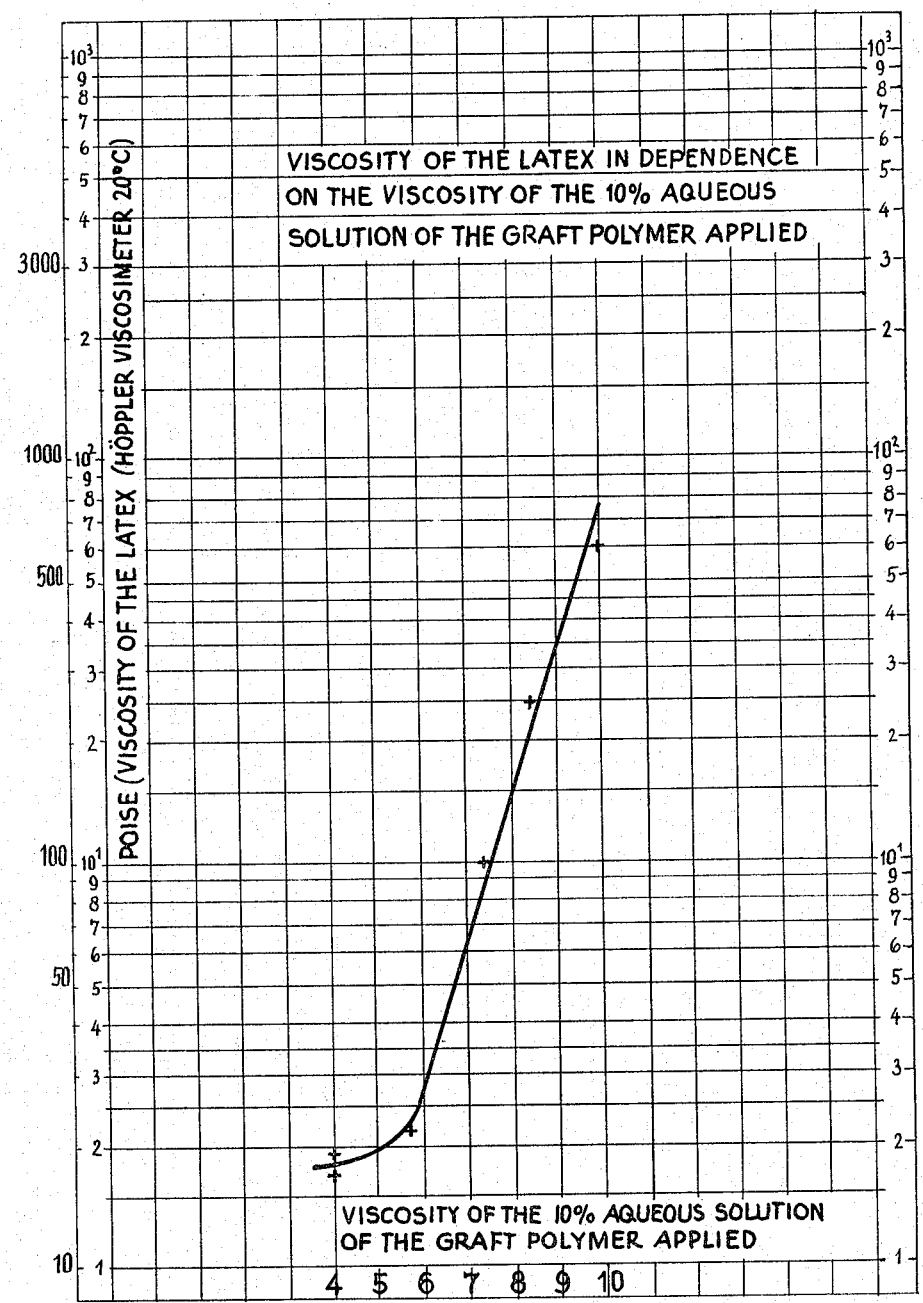
Figure 2A:
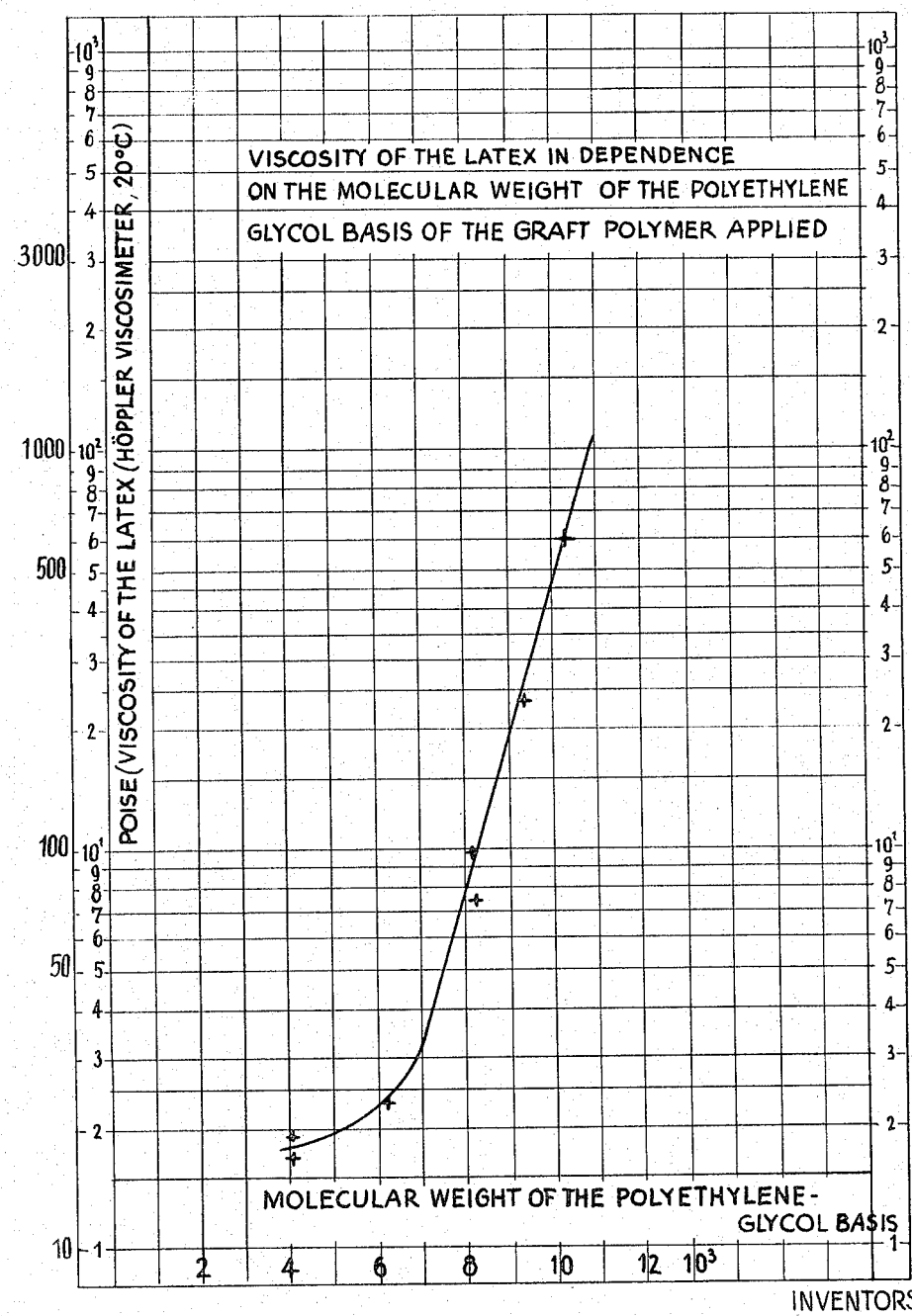

FIGURES 2 and 2a numerically show the relation between the viscosity of the aqueous solution or the molecular weight of the polyethylene glycol base of the graft polymer on the one hand and the latex-viscosity of the dispersions on the other hand.

Example 7

The proportions of the batch and the reaction conditions corresponded to those of Example 1 with the difference that the graft polymer was prepared directly in the reaction vessel for the subsequent dispersion polymerization.

The reaction was carried out in a cylindrical vessel of refined steel (capacity 10 liters) equipped with a stirrer which extended almost to the bottom, thermometer, reflux condenser and feeding vessel for the monomer.

(1) *Preparation of the graft polymer.*—230 grams of polyethylene glycol having a molecular weight of 4000 were melted in a vessel at 80° C., 62 grams of vinyl acetate containing 0.62 gram of benzoyl peroxide in the dissolved state were added dropwise to the reaction mixture during the course of about 60 minutes and the temperature of the reaction mixture was maintained at 80° C.

The graft polymerization of vinyl acetate on polyethylene glycol proceeded smoothly so that there was hardly any reflux. In order to convert the monomer residues the batch was heated for another 1½ hours at 90° C.

There were obtained 292 grams of a graft polymer containing 21% by weight of chemically-bonded vinyl acetate, the content of the graft polymer of residual monomer that was not bonded chemically amounting to 0.2%.

The graft polymer posessessed the properties already described in Example 1.

(2) *Preparation of the aqueous reaction medium.*—980 grams of water that had been freed from salt were stirred into the melt of the graft polymer that was still warm. The product rapidly dissolved in the water. Then there was added a solution consisting of 95 grams of polyvinyl alcohol of the type as described in Example 1, dissolved in 2073 grams of water that had been freed from salt. After the mixture had been adjusted with a 10% soda solution to a pH of 6 and then with formic acid to a pH of 3, the reaction mixture was heated to 80° C. and 14.5 grams of hydrogen peroxide of 35% strength were added as activator.

The method of adding 2636 grams of vinyl acetate and the remaining reaction conditions corresponded to the technique indicated in Example 1.

A dispersion was obtained having the properties as described in Example 1.

Example 8

This batch, as also the batch of the following Example 8a, was prepared with a graft polymer vinyl acetate/polyethylene glycol as the sole emulsifier or protective colloid. A comparison with the results of a batch prepared according to Example 6—in which the polymerization was carried out in the presence of the same amount of the same graft polymer—but with the additional use of polyvinyl alcohol (3.6 parts per 100 parts of monomer or 2.75% concentration in the aqueous phase) shows the advantages with respect to the quality of the dispersion obtained and the films made thereof with the use of the combination graft polymer/polyvinyl alcohol in contrast to the method of applying only a graft polymer.

In an apparatus as described in Example 1, the following solution was prepared as a reaction medium:

2988 grams of water, freed from salt and adjusted with formic acid to a pH of 3, 293 grams of a water-soluble graft polymer, as described in Example 6.

After heating the solution to 80° C., 7 grams of potassium persulfate were added and then the addition of the monomer commenced.

2635 grams of vinyl acetate were continuously run into the reaction mixture during the course of about 100 minutes while the temperature of the reaction mixture was 80° to 82° C. Approximately 10 minutes after the addition of the monomer was terminated, refluxing ceased and the temperature reached a height of 86° to 88° C. After cooling the dispersion obtained had the following properties:

Solid content 48%, content of residual monomer below 1%, relatively homogeneous and capable of being brushed, however, with a considerable proportion of coarser particles. The latex-viscosity was relatively low (8.5 poises). The dispersion films dried in the air were gritty, contained many knots and only exhibited a dull luster. They were very liable to reemulsification.

In contrast to the films obtained according to Example 6, the films were, moreover, brittle and possessed only the very low elongation at break of about 3%. As compared with Example 6, the tensile strength of 80 kg./cm.$^2$, moreover, only amounted to about 42% of the tensile strength obtained according to that example.

Example 8a

This example corresponds to Example 8 with the difference, however, that there was applied double the amount (586 grams) of the same graft polymer. The amount of vinyl acetate was reduced to 2350 grams in order to obtain a dispersion having a constant solid content. The reaction conditions were the same as those described in Example 8.

The dispersion obtained had the following properties:

Solid content 48.3%, content of residual monomer below 1%, pasty, relatively homogeneous consistency. The latex-viscosity could no longer be measured in the Höppler viscosimeter.

The films dried from the dispersion were highly gritty, the same as those obtained according to Example 8, and contained many knots. The films exhibited only a dull luster, were likewise brittle and did not possess a measurable elongation at break. With a tensile strength of about 94 kg./cm.$^2$, the films also in this respect practically did not differ from those obtained according to Example 8 since also the reemulsifiability was hardly reduced.

Thus it was found that even a substantial increase of the amount of graft polymer did not bring about an improvement of the properties of the dispersion when the graft polymer was used as sole emulsifier.

The films made of the dispersions as obtained according to Examples 8 and 8a, moreover, at once exhibited whitening when being watered and strongly plasticized at the same time, while films of the dispersions as prepared according to Examples 6 and 1 only became opalescent and remained intact even when being rubbed strongly.

Example 9

The proportions of the batch and the reaction conditions remained the same as described in Example 6 with the difference, however, that instead of the graft polymer vinyl acetate/polyethylene glycol (molecular weight 25,000) used in that example there was applied pure polyethylene glycol having a molecular weight of 25,000.

There was obtained a dispersion having a solid content of 50%, a content of residual monomer of 0.5% and the relatively low latex-viscosity of 19 poises. In contrast to the dispersion according to Example 6 the dispersion did not exhibit the high freeze-thaw stability down to −18° C. but only down to about −5° C.

The films obtained from the dispersion by drying in the air were gritty in a high degree, exhibited a turbid translucency and contained many knots. The luster was dull. The film strongly plasticized upon watering and was very liable to reemulsification.

The film possessed no elongation at break and was brittle. The tensile strength thereof was 59 kg./cm.$^2$ and thus amounted only to 31.5% of the tensile strength of a film obtained according to Example 6.

A comparison between Examples 6 and 9 showed that with polyethylene glycol as an emulsifier in addition to polyvinyl alcohol there were not obtained the improved properties of a dispersion and the films made thereof as was the case in the dispersion polymerization carried out in the presence of a water-soluble graft polymer of vinyl acetate/polyethylene glycol and polyvinyl alcohol.

Example 10

There was prepared a dispersion of a copolymer consisting of 77 parts of vinyl acetate and 23 parts of dibutyl maleate.

In a flask (capacity 2 liters) equipped with stirrer, thermometer, reflux condenser and feeding vessel, the following solution was prepared as an aqueous reaction medium:

395 grams of water, freed from salt,
17.5 grams of polyvinyl alcohol containing about 10% by weight of acetyl groups (viscosity of the 4% aqueous solution about 8 centipoises at 20° C.),
3.0 grams of polyvinyl alcohol containing about 10% by weight of acetyl groups (viscosity of the 4% solution about 16 centipoises at 20° C.),
0.5 gram of the sodium salt of the sulfuric acid semiester of dodecyl alcohol,
0.45 gram of sodium bicarbonate,
50.00 grams of a water-soluble graft polymer vinyl acetate/polyethylene glycol with a content of 14.3% by weight of vinyl acetate and a molecular weight of the polyethylene glycol base of about 25,000. The viscosity of the 10% aqueous solution of this product was 40.5 centipoises, the turbidity point of the 1% solution was situated at about 94° C. A 1% solution at 20° C. had a surface tension of 43.8 dynes/cm.

The mixture of monomers consisting of 346.5 grams of vinyl acetate and 103.5 grams of dibutyl maleate was emulsified in this solution at room temperature during the course of about 30 minutes, with agitation.

The mixture was heated to 67° C. and then a solution of 0.75 gram of potassium persulfate in 20 cc. of water was added to it. Owing to the reaction heat of the polymerization which now commenced the temperature of the emulsion rose to about 72° C. and was maintained at this height for 3 hours and 20 minutes. During the course of the following 60 minutes, the temperature due to an impoverishment of monomers and the diminishing of the cooling by a sufficiently intense reflux conditioned thereby rose further and finally attained a peak of 84.5° C. The reaction mixture was maintained for another 30 minutes at this temperature in order to convert the residues of monomer and was then cooled to room temperature A homogeneous dispersion was obtained having a pasty consistency and a solid content of 55.5% and a residual monomer content below 1%. The dispersion was thixotropic and capable of being brushed easily. The homogeneity of the dispersion was not altered by cooling it several times to −18° C. and reheating it afterwards. The dispersion film dried in the air was homogeneous, transparent and exhibited a high gloss. It was stable to reemulsification. The elongation at break amounted to 400%.

Example 10a

The operation was carried out as described in Example 10, however, without the addition of the graft polymer. The amount of the latter was replaced by increasing the amount of the monomer mixture vinyl acetate/dibutyl maleate (77:23) by 50 grams.

There was obtained a highly viscous dispersion which was strongly rheopex and could be brushed with difficulty only. The freeze-thaw stability of the dispersion was situated at −5° C. and thus was substantially lower as compared with the dispersion obtained according to Example 10. The dispersion film dried in the air was homogeneous, but was somewhat turbid and only had a dull luster. In contrast to the film obtained according to Example 10 it was not stable to reemulsification. Its elongation at break was only 245% and thus only amounted to about 60% of that of the dispersion film obtained according to Example 10.

A comparison between Example 10 and Example 10a showed that also in the case of a copolymer dispersion a variety of properties of the dispersion were improved by the polymerization in the presence of a graft polymer vinyl acetate/polyethylene glycol and polyvinyl alcohol.

*Example 11*

Preparation of a copolymer dispersion consisting of 70 parts of vinyl acetate and 30 parts of butyl acrylate.

In an apparatus as described in Example 10, the following solution was prepared as an aqueous reaction medium:

521 grams of water, freed from salt,
30 grams of polyvinyl alcohol containing about 12% by weight of acetyl groups and having a K-value (according to Fikentscher, "Cellose-Chemie," vol. 13, page 58 1932)) of 45 to 48,
12 grams of nonyl phenol, condensed with 10 to 12 moles of ethylene oxide,
2.5 grams of sodium oacetate, anhydrous.

The solution was heated to 72° C. and 2.5 grams of ammonium persulfate, dissolved in 30 cc. of water, were added to it. Immediately thereafter the addition of the monomer mixture commenced which consisted of 372 grams of vinyl acetate and 160 grams of butyl acrylate in which were dissolved 28 grams of a graft polymer vinyl acetate/polyethylene glycol having the composition and the properties as described in Example 10. The monomer was added continuously at a uniform rate and was terminated during the course of 52 minutes. During this period the reaction temperature rose to about 79° C. and attained a peak of 87° C. after the monomer addition was terminated and refluxing had ceased. The reaction mixture was maintained for another 30 minutes at a temperature of about 85° C. and the finished dispersion was then cooled to room temperature.

The dispersion was homogeneous, of a pasty consistency, it had a solid content of 52.5% and only contained 0.7% of residual monomer. The dispersion was stable at −18° C. Dispersion films dried in the air were stable to reemulsification and possessed an elongation at break of 600%.

If instead of this graft polymer having a high molecular weight a graft polymer having a low molecular weight was used, for example, a product as applied in Example 1, a fluid dispersion was obtained having a lower latex-viscosity but otherwise the same good properties.

*Example 11a*

The operation was carried out as described in Example 11, however, without the use of the graft polymer. The 28 grams of graft polymer as used in Example 11 were replaced by the same amount of a mixture consisting of 70 parts of vinyl acetate and 30 parts of butyl acrylate.

A homogeneous dispersion having a solid content of about 52% was obtained which had a latex viscosity of 9 poises. In contrast to the dispersion as obtained according to Example 11, its freeze-thaw stability was substantially lower (−5° C.). The dried film was readily liable to re-emulsification. Its elongation at berak amounted to 490%.

A comparison between Examples 11 and 11a showed that the polymerization in the presence of a graft polymer vinyl acetate/polyethylene glycol and polyvinyl alcohol as a protective colloid, also in the case of this copolymer dispersion, was extraordinarily advantageous in order to improve the properties of the dispersion and of the film, such as the freeze-thaw stability and the stability to reemulsification.

We claim:
1. A process for the production of aqueous dispersions of vinyl ester polymers having a good freeze-thaw stability, which comprises the step of polymerizing at least one monomer selected from the group consisting of vinyl esters of aliphatic saturated carboxylic acids with 2 to 18 carbon atoms and vinyl benzoate in the presence of an emulsifier combination consisting of 1 to 20 parts by weight of a water soluble graft polymer of vinyl acetate on polyalkylene glycol and 1 to 15 parts by weight of a polyvinyl alcohol, said parts being calculated on 100 parts of the monomer.

2. A proces as claimed in claim 1, wherein the polymerization is carried out at a temperature within the range of 67° to 90° C.

3. A process as claimed in claim 1, wherein the polymerization is carried out at a pH within the range of 2.5 to 7.

4. A process for the production of aqueous dispersions of vinyl ester polymers having a good freeze-thaw stability which comprises the step of polymerizing vinyl acetate in the presence of an emulsifier combination consisting of 1 to 20 parts by weight of a water soluble graft polymer of vinyl acetate on polyalkylene glycol and 1 to 15 parts by weight of a polyvinyl alcohol, said parts being calculated on 100 parts of the vinyl acetate.

5. A process for preparing aqueous dispersions of vinyl ester polymers of good freeze-thaw stability which comprises copolymerizing (a) a monomer selected from the group consisting of vinyl esters of aliphatic saturated carboxylic acids of 2 to 18 carbon atoms and vinyl benzoate with (b) up to 50 mol percent, based on the total monomer, of an ester of a monohydric saturated aliphatic alcohol of 1 to 8 carbon atoms and an unsaturated acid selected from the group consisting of maleic acid, fumaric acid, itaconic acid, acrylic acid and methacrylic acid in the presence of an emulsifier combination consisting essentially of 1 to 15 parts of polyvinyl alcohol and of 1 to 20 parts of a water-soluble graft polymer of vinyl acetate on a polyalkylene glycol, said parts being calculated on 100 parts of total monomer.

6. A process as in claim 1 wherein said graft polymer is formed of vinyl acetate and polyethylene glycol.

7. A process as in claim 1 wherein said polyvinyl alcohol comprises up to 25% by weight of acyl groups and has a turbidity point of higher than 90° C. when in 10% aqueous solution.

8. A process as in claim 1 wherein said graft polymer has a turbidity point of about 90° C. when in 1% aqueous solution.

9. An aqueous dispersion of a member of the group consisting of polymerized vinyl esters of aliphatic saturated carboxylic acids of 2 to 18 carbon atoms and polymerized vinyl benzoate containing, per 100 parts by weight of polymer, an emulsifier combination consisting essentially of 1 to 15 parts by weight of polyvinyl alcohol and 1 to 20 parts by weight of a water-soluble graft polymer of vinyl acetate on a polyalkylene glycol.

10. An aqueous dispersion as defined in claim 9 wherein the graft polymer in the emulsifier combination is a graft polymer of vinyl acetate on polyethylene glycol.

11. An aqueous dispersion of a copolymer of (a) a monomer selected from the group consisting of vinyl esters of aliphatic saturated carboxylic acids of 2 to 18 carbon atoms and vinyl benzoate with (b) up to 50 mol percent, based on the total monomer, of an ester of a monohydric saturated aliphatic alcohol of 1 to 8 carbon atoms and an unsaturated acid selected from the group consisting of maleic acid, fumaric acid, itaconic acid, acrylic acid and methacrylic acid, said dispersion containing, per 100 parts by weight of copolymer, an emulsifier combination consisting essentially of 1 to 15 parts by weight of polyvinyl alcohol and 1 to 20 parts by weight of a water-soluble graft polymer of vinyl acetate on a polyalkylene glycol.

References Cited by the Examiner
UNITED STATES PATENTS 3,030,326 4/1962 Goldberg et al. _____ 260—29.6
3,218,281 11/1965 Rees _____ 260—29.6

FOREIGN PATENTS 834,900 5/1960 Great Britain.

MURRAY TILLMAN, *Primary Examiner.*
WILLIAM H. SHORT, *Examiner.*
J. NORRIS, W. J. BRIGGS, *Assistant Examiners.*